United States Patent [19]

Nakai

[11] Patent Number: 4,746,947

[45] Date of Patent: May 24, 1988

[54] EXPOSURE CALCULATING DEVICE

[75] Inventor: Masaaki Nakai, Kawachinagano, Japan

[73] Assignee: Minolta Camera Kabushiki Kaisha, Osaka, Japan

[21] Appl. No.: 832,702

[22] Filed: Feb. 25, 1986

[30] Foreign Application Priority Data

Feb. 25, 1985 [JP] Japan .................................. 60-36019
Mar. 19, 1985 [JP] Japan .................................. 60-55017

[51] Int. Cl.$^4$ ........................ G03B 3/00; G03B 15/05; G03B 7/28
[52] U.S. Cl. ................................... 354/402; 354/416; 354/432
[58] Field of Search ............... 354/400, 402, 412, 414, 354/416, 417, 429, 431, 432, 433, 434; 356/222; 250/214 P; 315/241 P

[56] References Cited

U.S. PATENT DOCUMENTS

| | | | |
|---|---|---|---|
| 4,412,730 | 11/1983 | Saegusa et al. | 354/432 |
| 4,423,936 | 1/1984 | Johnson | 354/432 X |
| 4,464,037 | 8/1984 | Terui et al. | 354/400 |
| 4,465,369 | 8/1984 | Saegusa et al. | 354/432 X |
| 4,508,443 | 4/1985 | Matsuzaki et al. | 354/402 |
| 4,514,073 | 4/1985 | Taniguchi et al. | 354/416 X |
| 4,557,579 | 12/1985 | Nakajima | 354/402 |
| 4,589,756 | 5/1986 | Saegusa | 354/432 |
| 4,609,274 | 9/1986 | Iwashita et al. | |

Primary Examiner—W. B. Perkey
Attorney, Agent, or Firm—Burns, Doane, Swecker & Mathis

[57] ABSTRACT

An exposure calculating device is disclosed, in which a field of view is divided into a plurality of areas and the brightness values of these areas are measured. Luminance values are calculated based on signals derived from the measured brightness. Under certain conditions, the luminance in the center of the field of view is found, and is used to recalculate the luminance values for an exposure calculation. Further, a brightness control means is provided that divides the field of view into a plurality of areas, any one of which or all may be selected to control the brightness of the exposure.

7 Claims, 10 Drawing Sheets

EXPOSURE CALCULATING DEVICE

BACKGROUND OF THE INVENTION

1. Field of the Invention

The present invention relates to an exposure calculating device which divides the field of view about to be photographed into a plurality of areas and then measures the luminance values of the areas, for exposure calculation.

2. Description of the Prior Art

A conventional device for exposure calculation is disclosed in U.S. Pat. No. 4,412,730, where the field of view about to be photographed is divided into a plurality of areas, and then the luminance value of the divided areas are measured. The difference between the maximum luminance value and the minimum luminance value is obtained, or the luminance at the center of the field of view is compared with the maximum or minimum luminance value to judge the conditions of photography. The luminance values derived from the areas are used to perform exposure calculation according to the conditions.

A so-called AE (automatic exposure) lock technique has also been known. According to this technique, the range of measured brightness values is adjusted relative to a desired object. The data about the luminance obtained from the desired object is stored in a memory. After the range is altered, exposure calculation and control operation are performed, based on the stored data about the luminance.

When exposure is controlled using the calculation method disclosed in the aforementioned U.S. Pat. No. 4,412,730, the probability that the field of view to be photographed, especially the main subject, provides an appropriate exposure is undoubtedly much higher than the conventional case where exposure is controlled using the average luminance of the field of view. However, it is believed that the main subject is not yet sufficiently taken into account. For example, when such an exposure calculation is performed, if the maximum luminance obtained on the measured, divided areas is 9 or more in APEX system, the luminance of the main object is set equal or nearly equal to the minimum luminance. However, the main object does not always exist in the area giving the minimum or nearly minimum luminance.

When the aforementioned AE lock procedure is employed, the luminance of the object is stored in a memory and so an appropriate exposure is assured with respect to the object. Unfortunately, the other brighter or darker areas may yield under-exposure or over-exposure.

In prior art cameras, a flashlight control device for controlling the amount of flashlight used for flashlight photography is incorporated either in the body of an electronic flash device or in the body of a camera. In either case, the area subjected to brightness control covers substantially the whole field of view to be photographed or a relatively broad region including the center of the field of view.

In those flashlight control devices, the brightness control level at which emission of flashlight is stopped is determined based on the ratio of the amount of reflected light to be given amount of emitted flashlight. As an example, an object having a certain reflectivity (average reflectivity) is disposed opposite to a flash device so as to include the area subjected to brightness control. Then, a flashlight is emitted toward the object. The brightness control level is determined based on the amount of light reflected from the object such that the object provides a suitable exposure.

In the general flashlight photography, the amount of light reflected from an object to be photographed varies. Hence, over-exposure or under-exposure may take place, depending on the setting of the brightness control level. More specifically, if the objective lens is changed to one having different focal length or the object consists of a single or plural persons, i.e., if the object accounts for a different proportion, then the amount of light reflected from the subject and falling on the flashlight device will necessarily vary. This changes the amount of flashlight, which is determined by the amount of light incident on the flashlight device. As a natural consequence, exposure is not stable.

In order to solve these problems, a means may be contemplated in which the area used for control over luminance is narrowed into a spot, which is directed to the object to be photographed, for luminance control. If this means is carried out, the area for luminance control is always placed within the object, and the amount of reflected light is maintained constant. As a result, an appropriate exposure will be obtained. If the object lies outside the area for luminance control, however, the amount of flashlight is made inappropriate with respect to the object, leading to unsuitable exposure. As the area for luminance control is decreased, the probability of this undesired situation increases.

SUMMARY OF THE INVENTION

It is an object of the present invention to provide an exposure calculating device which allows a main object centering a field of view to be photographed with increased probability of appropriate exposure.

It is another object of the invention to provide an exposure calculating device which, when the object is photographed with flashlight, performs arithmetic operations for controlling the amount of the flashlight so that the main object can be photographed with appropriate exposure.

In recent years, cameras having automatic focus-detecting devices have gained wide acceptance. In general, a detection area for detecting the focusing condition of the objective lens is set at the center of the field of view of such a camera. The orientation of the camera is so determined that a portion of the main object is placed in the detection area.

The invention is applied to a camera having the aforementioned AE lock or focus-detecting function. When the AE lock is actuated or a focus-detecting device has detected the focusing condition, it is assumed that the main object exists at the center of the field of view with a high probability. The field of view is divided into a plurality of areas. The luminance value at the center of the field of view is stored in a memory and so on. Then, luminance values are obtained by, for example, the calculation method as disclosed in the aforementioned U.S. Pat. No. 4,412,730. The luminance values stored are used to recalculate the luminance values, in such a way that the whole field of view which the main object centers is made appropriate.

Figure 1:
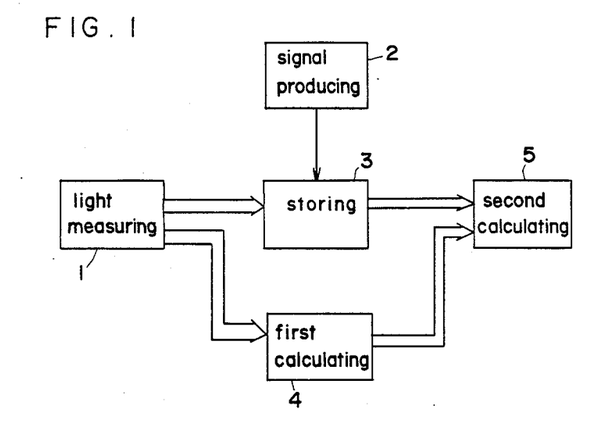
FIG. 1 is a block diagram of a device according to the present invention.

A construction for achieving this is shown in FIG. 1, and comprises a light measuring means 1, an instruction signal producing means 2, a storing means 3, a first calculating means 4, and a second calculating means 5.

The field of view is divided into a plurality of areas. The luminance on each area is measured by the light measuring means 1 which produces output corresponding to the luminance. The instruction signal producing means 2 produces an instruction signal corresponding to the brightness at the center of the field of view and supplies the signal to the storing means 3 which stores the input data as a first luminance value. The output signal from the light measuring means 1 is applied to the first calculating means 4 that arithmetically finds the brightness on each area, which is hereinafter referred to as second luminance value. The output signal from the first calculating means 4 is fed to the second calculating means 5, which also receives the signal indicative of the first luminance value from the storing means 3. The second calculating means 5 calculates luminance values for exposure calculation, based on its two input signals.

When the instruction signal processing means 2 produces an instruction signal to the storing means 3, the storing means 3 stores the first luminance value corresponding to the brightness at the center of the field of view that is divided into the areas. At the same time, the first calculating means 4 receives the output signal from the light measuring means 1 and arithmetically finds second luminance values corresponding to the brightness on each area. Then, the signals indicating the first and second luminance values are applied to the second calculating means 5 to arithmetically process them, for obtaining luminance values used for exposure calculation.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DETAILED DESCRIPTION OF THE PREFERRED EMBODIMENTS

Figure 2:
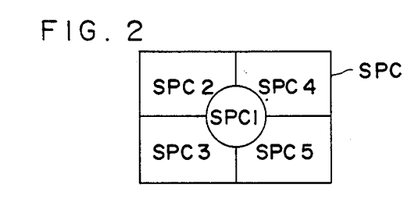
FIG. 2 shows a split pattern of a light-receiving device used for embodiments of the invention.

Referring to FIG. 2, there is shown a division pattern formed by light-receiving device SPC and used for examples of the invention. The field of view to be photographed is divided into five areas SPC1-SPC5. A focus detection area for detecting the focus is included in the area SPC1.

Figure 3:
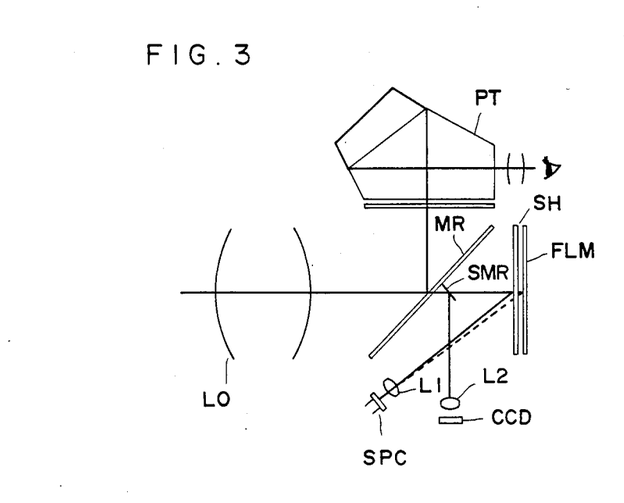
FIG. 3 is a schematic diagram of an optical system for focus detection and for luminance measurement made by a camera.

FIG. 3 shows an optical system for focus detection and measurement of luminance made by examples of the invention.

The optical system for focus detection is first described. Light is permitted to pass through an objective lens $L_0$, and is then partially transmitted through a main mirror MR entirely consisting of a half mirror. A portion of the light transmitted therethrough is reflected on a submirror SMR and brought into focus on charge-coupled device CCD by a lens L2.

The optical system for measurement of luminance is now described. Light is permitted to pass through the objective lens $L_0$, and then it is partially transmitted through the main mirror MR. Thereafter, the portion transmitted is brought into focus on a shutter curtain SH having a diffusion surface on its surface. This diffusion surface is so processed that its reflectivity is substantially equal to that of a film surface FLM. The image formed on the shutter curtain SH is again brought into focus on the light-receiving device SPC by a lens L1. Luminance is measured for each individual area shown in FIG. 2. After the shutter is released, the main mirror MR and the submirror SMR are moved away from the optical axis, and the image to be photographed is brought into focus on the film surface FLM. Since this image on the film surface FLM is again brought into focus on the light-receiving devices SPC, it is possible to monitor the light reflected from the object for each individual area shown in FIG. 2.

Figure 4:
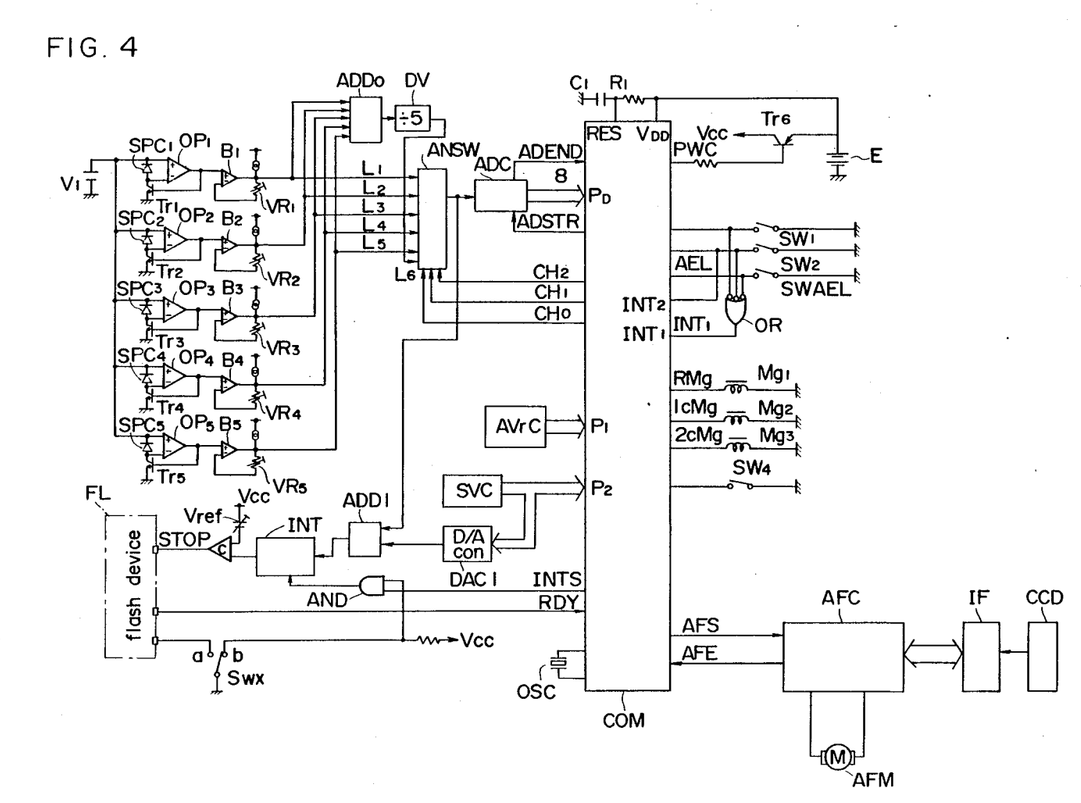
FIG. 4 is a diagram of an electric circuit constituting a first embodiment of the present invention.

Referring next to FIG. 4, there is shown an electric circuit of a first embodiment according to the invention. This circuit includes a microcomputer COM that acts to control operations performed by the whole camera system in a sequential manner and to perform calculating operations. A voltage source V1 supplies a bias voltage to the light-receiving devices. Operational amplifiers OP1-OP5 are connected to the light-receiving elements SPC1-SPC5, respectively, which measure the luminance values on the areas shown in FIG. 2. Transistors Tr1-Tr5 convert voltages that are a logarithmic function of the output currents of the light-receiving elements SPC1-SPC5 into respectively corresponding logarithmic compressed voltages. Buffers B1-B5 are used for impedance conversion. Variable resistors VR1-VR5 are employed to accommodate the characteristic variations among the elements. An adder circuit $ADD_0$ sums up the output signals from the buffers B1-B5. A division circuit DV produces an output that is equal to the adder circuit output divided by a numeral. An analog switch ANSW permits any one of the outputs from the buffers B1 to B5 to be delivered, according to the signal from the microcomputer COM. An analog-to-digital converter ADC converts the analog signal from the switch ANSW into digital form of eight bits. A power supply is indicated by E. A combination of a resistor R1 and a capacitor C1 can reset the microcomputer COM. All the circuit other than the microcomputer is energized through a transistor Tr6. When a shutter release button is depressed to a first position, a photography preparation switch $SW_1$ is turned on and initiates measurement of luminance as well as detection of the focus. When the release button is depressed further to a second position, a release switch $SW_2$ is actuated to start an operation for driving the shutter. The data about the luminance at the center ($SPC_1$) of the field of view divided as shown in FIG. 2 is caused to be stored in the microcomputer in response to operation of an AE lock switch $SW_{AEL}$. A magnet $Mg_1$ is used to start the shutter release operation. Magnets $Mg_2$ and $Mg_3$ lock the first and second shutter curtains, respectively. A timing switch $SW_4$ is turned off when the film has been wound by one frame and turned on when the second shutter curtain completes its travel. Indicated by OSC is an oscillator. An aperture value-setting circuit AVrC produces an output signal in digital form of eight bits indicating the difference ($AV_{SET}-AV_0$) between the set aperture value $AV_{SET}$ and the aperture value $AV_0$ obtained when the aperture diaphragm of the lens is fully opened. The difference is expressed in terms of the number of aperture stop down steps and is supplied to the microcomputer COM. A film sensitivity-setting circuit SVC converts the set film sensitivity into digital form of eight bits, which is supplied to the microcomputer COM.

The circuitry shown in FIG. 4 further has a circuit for producing a flash halt signal and sending the signal to an electronic flash device FL. This circuit comprises a digital-to-analog converter $DAC_1$ for converting the digital signal from the film sensitivity-setting circuit SVC into analog form, an adder circuit $ADD_1$ for producing an output that is the sum of the output signal from the analog switch ANSW and the analog output from the converter $DAC_1$, an integrator circuit INT for integrating the output signal from the adder circuit $ADD_1$, and a comparator circuit C for comparing the output voltage from the integrator circuit INT with a reference voltage $V_{ref}$. A synchronous switch SWX for initiating a flashlight emission is usually connected to a terminal b. When the first curtain of the shutter completes its movement, it is switched to a terminal a. When movement of the second curtain of the shutter is started, it is switched back to the terminal b.

The circuitry shown in FIG. 4 is equipped with an automatic focus-detecting device that comprises charge-coupled devices CCD for collecting information about the brightness of the object, an interface circuit IF for converting the output signals from the charge-coupled devices CCD into other desired form, and a focus calculating circuit AFC which arithmetically processes the data about the object and controls an electric motor AFM to drive the objective lens.

Figure 7:
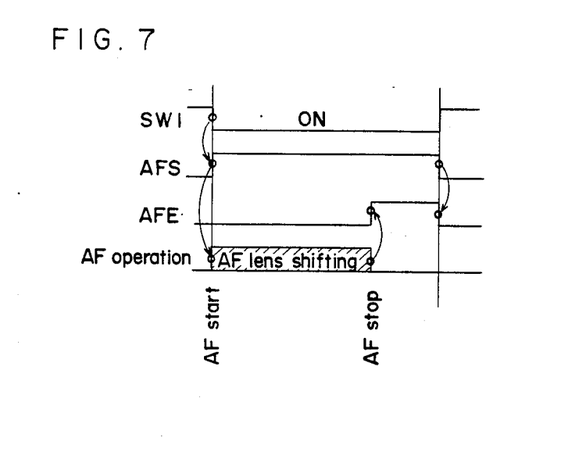
FIG. 7 is a time chart for illustrating the operation of an automatic focus detection device used for the first embodiment.

The operation of the automatic focus detection device is now described by referring to the time-chart of FIG. 7. When the photography preparation switch $SW_1$ is turned on, the microcomputer COM delivers focus detection start signal AFS to the focus calculating circuit AFC to start an operation for detecting the focus condition of the objective lens. Then, the lens is driven by the motor AFM until an in-focus condition is detected. The motor AFM is then stopped, so that the lens is no longer driven. At the same time, the focus calculating circuit AFC delivers a focus detection end signal AFE to the microcomputer COM. After the in-focus condition is once detected, the focus detection is not again performed even when the framing is altered unless the photography preparation switch $SW_1$ is again released.

The operation of the circuitry constructed as described above is next described by referring to the flowcharts of FIGS. 5(a), 5(b), 6(a) and 6(b). When a battery is installed, the input signal applied to the reset terminal RES of the microcomputer COM changes state from low level "0" to high level "1" and the oscillator OSC starts oscillating. The microcomputer COM then carries out reset routine (RESET) shown in FIG. 5(a). In this routine, all the output signals appearing at the microcomputer's output terminals RMg, 1CMg, 2CMg, PWC, AFS, ADSTR and INTS and flags FLG1 and FLG2 are reset (steps #1–#7, #10, #11). Interruption 2 (INT 2) is disabled (#8), while interruption 1 is enabled (#9). When these conditions, a stop instruction stops the oscillation of the oscillator OSC. Also, the microcomputer COM itself ceases to operate (steps #12). In this state, almost no electric current is consumed. TINT (step #13) is a timer interrupt which will be further described below.

Then, when the photography preparation switch $SW_1$, the release switch $SW_2$, or the AE lock switch $SW_{AEL}$ is turned on, a signal applied from an OR circuit OR to an input terminal $INT_1$ of the microcomputer COM changes from "0" level to "1" level. Then, the microcomputer COM carries out the routine for interruption 1 (INT 1) in the manner as described below, the routine flowchart being shown in FIG. 5(b).

Figure 5A:
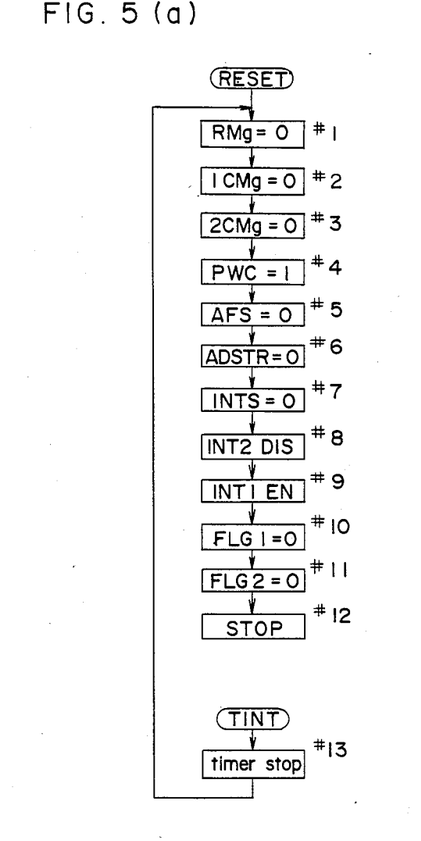
FIGS. 5(a) and 5(b) are flowcharts for illustrating a sequence of operations performed by the first embodiment.
Figure 5B:
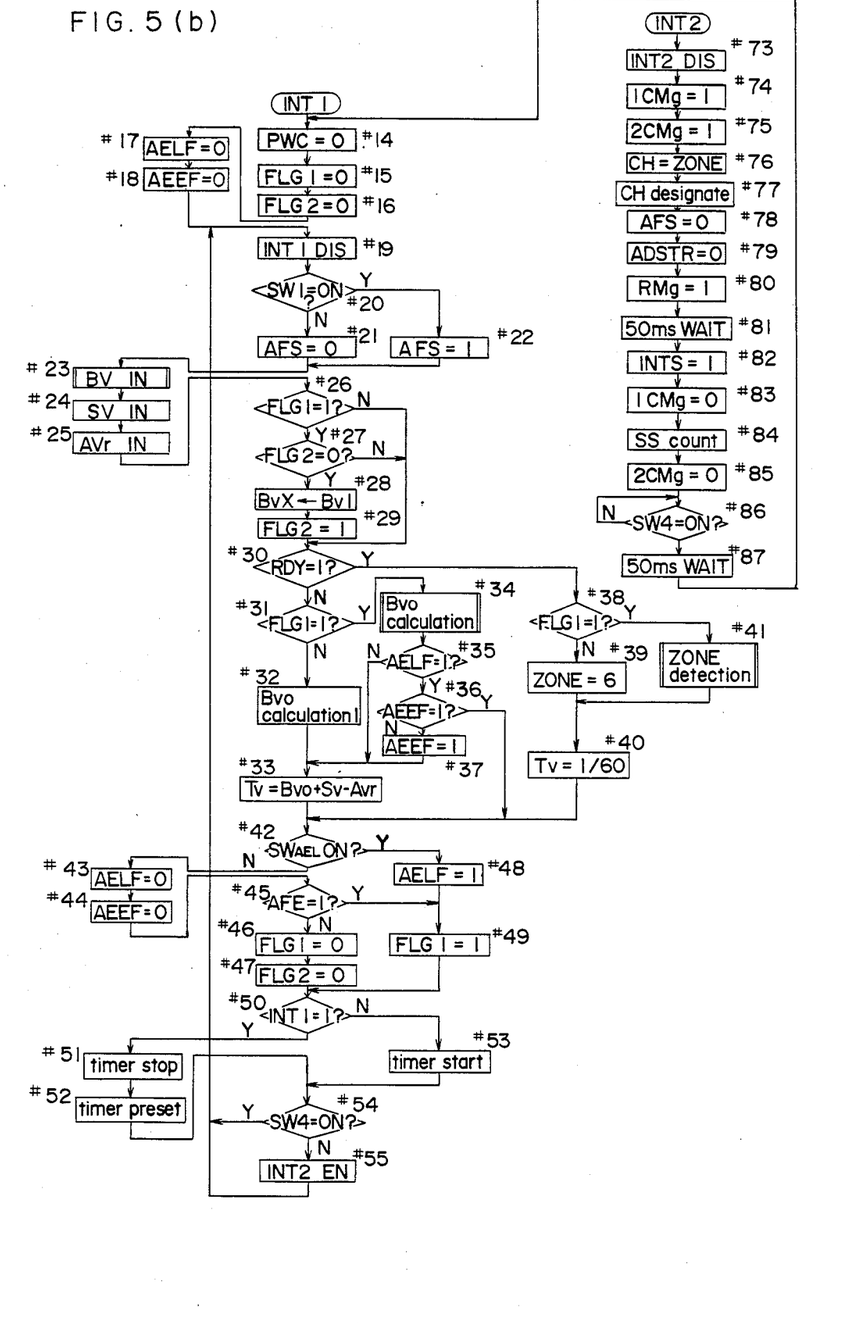

First, the signal level at an output terminal PWC of the microcomputer COM is turned to "0". This drives the transistor Tr6 on, energizing all the sections (#14). Subsequently, flag 1 (FLG 1), flag 2 (FLG 2), AE lock flag (AELF), and AE calculation end flag (AEEF) are reset (#15 –#18). Then, interruption to the interruption 1 is disabled (#19). A check is performed to ascertain whether the photography preparation switch $SW_1$ has been turned on (#20). If so, the focus detection start signal (AFS) is increased to "1" level to start an operation for detecting the focusing condition (#22). If it is not so, the focus detection start signal (AFS) is reduced to "0"0 level (#21). As such, if the switch $SW_1$ is turned off during operation for detection of the focusing condition, the operation is halted.

Figure 6A:
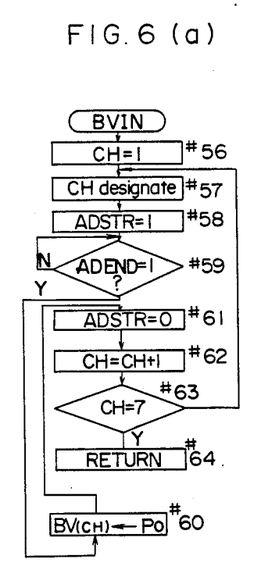
FIGS. 6(a)-6(c) are flowcharts for illustrating sequences of operations performed by the first embodiment.

Then, the flow proceeds to a subroutine (BVIN) for receiving signals indicating luminance values (#23). In this subroutine, as shown in FIG. 6(a) the output signals from the light-receiving elements SPC1–SPC5 and their average value are converted into digital form, which is supplied to the microcomputer COM. More specifically, channels $CH_1$–$CH_3$ are designated as in Table 1 below. The analog switch ANSW delivers analog output indicating the luminance value received over lines L1–L6. Then, analog-to-digital conversion start signal ADSTR is increased to "1" level to initiate analog-to-digital conversion. After the completion of the conversion, analog-to-digital conversion end signal ADEND is brought to "1" level. These successive operations are repeated for each luminance value. The resultant digital signals are fed to registers BV1–BV6 of the microcomputer COM (#56–#64).

TABLE 1

| $CH_2$ | $CH_1$ | $CH_0$ | line | register |
| --- | --- | --- | --- | --- |
| 0 | 0 | 0 | $L_1$ | $BV_1$ |
| 0 | 0 | 1 | $L_2$ | $BV_2$ |
| 0 | 1 | 0 | $L_3$ | $BV_3$ |
| 0 | 1 | 1 | $L_4$ | $BV_4$ |
| 1 | 0 | 0 | $L_5$ | $BV_5$ |

TABLE 1-continued

| CH$_2$ | CH$_1$ | CH$_0$ | line | register |
|---|---|---|---|---|
| 1 | 0 | 1 | L$_6$ | BV$_6$ |

Then, in the INT 1 routine shown in FIG. 5(b) the film sensitivity-setting circuit SVC applies digital signal indicating the film sensitivity to port P2 of the microcomputer COM (step #24). The aperture value-setting circuit AVrC supplies a digital signal indicative of the aperture expressed in terms of the number of aperture stop down steps to port P1 of the microcomputer COM (step #25). They are furnished to registers SV and AVr, respectively. Subsequently, flags 1 and 2 (FLG1 and FLG2), are checked (#26, #27). When the in-focus condition is detected during automatic focus detection, or when the AE lock switch SW$_{AEL}$ is turned on, the luminance value at the center (SPC1) of the field of view is stored. If the condition of flag 1 (FLG 1)=1 and flag 2 (FLG 2)=0 hold, the contents of the register BV1 are transferred to another register. The luminance value entered in this way is taken to be BV$_x$ (#28).

The flag 1 (FLG1) indicates whether the contents of the register holding the luminance value BV$_x$ are significant or not. The flag 2 (FLG2) is set to "1" after the luminance value BV$_x$ is entered into the register. Therefore, the luminance value BV$_x$ is entered into the register just when the flag 2 (FLG2) changes from "0" to "1" (#28, #29).

The following routines are used to calculate the shutter speed, or exposure time value TV. Depending on whether a main capacitor of the electronic flash device FL has been fully charged, or on whether the luminance value BV$_x$ is significant (FLG1=1) or not (FLG1=0), one of the four following routines is employed. The flash device FL produces a charge completion signal RDY and sends it to the microcomputer COM. This signal RDY assumes value "1" if the main capacitor has been fully charged and value "0" if it is not yet charged. Routine (1) RDY=0, FLG1=0 (step #30-32).

The photograph is taken under natural light. Exposure calculation is performed under the condition that the luminance value BV$_x$ is not yet entered into the register.

As known in the prior art techniques, excessively highlight portions and shadow portions are removed, based on the luminance values of the divided areas. Then, a luminance value BV$_0$ that provides a high probability of appropriate exposure is computed, based on the average value of the luminance of the remaining portions (#30–#32). It is also possible to calculate the luminance value by the calculation method as disclosed in the aforementioned U.S Pat. No. 4,412,730. Routine (2) RDY=0, FLG1=1 (step #34-37)

The photograph is taken under natural light. Exposure calculation is performed under the condition that the luminance value BV$_x$ is entered into the register when the AE lock is established or the in-focus condition is detected.

Information about the luminance value BV$_x$ is available, in addition to the information obtained as described in Routine (1) above. A new luminance value BV$_0$ that is more approximate to the stored luminance value BV$_x$ is calculated, based on the luminance value calculated in Routine (1). As a result, appropriate exposure can be derived in which the surroundings are taken into account as well as the main object (#30, #31, #34).

Figure 6B:
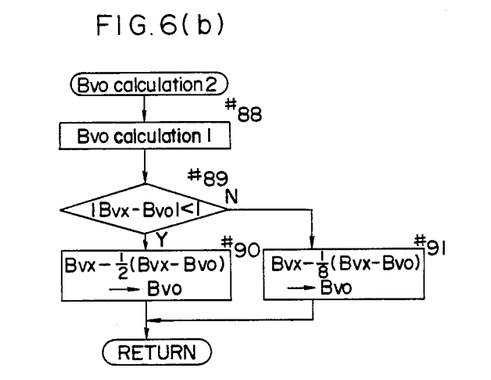

This further described by referring to the subroutine BV$_0$ calculation 2 shown in FIG. 6(b) for exposure calculation. First, the luminance value BV$_0$ is computed while not considering the luminance value BV$_x$, in the same manner as in Routine (1) (#88). The computed value is then compared with the stored luminance value BV$_x$ (#89). Then, a certain proportion of the resulting difference is used to recalculate the luminance value BV$_x$.

More specifically, the certain proportion is set such that
(a) when $|BV_x - BV_0| < 1$, the proportion is set equal to the half the difference (#90),
(b) when $|BV_x - BV_0| > 1$,
the proportion is equal to one-eighth the difference (#91).

Then, the luminance value is determined, based on the luminance of the main object. A further means may be contemplated in which the luminance values BV$_x$ are recalculated by introducing a certain amount corresponding to the difference.

As a further calculation method, either a certain proportion of the difference or a certain amount corresponding to the difference may be feedbacked to the luminance value BV$_0$. That is, in step #91, $BV_0 - \frac{1}{8}(BV_0 - BV_x)$ could be set equal to BV$_0$ (#91'). Or, as in step #91, $BV_0 - \frac{1}{2}(BV_6 - BV_x)$ could be set equal to BV$_0$ (#90'). The luminance value BV$_0$ obtained in step #88 is added to the luminance value derived from the main object. Then, a luminance value closer to the luminance of the object may be found by taking the luminance distribution over the whole field of view into account.

Then, returning to the INT1 routine shown in FIG. 5(b), a check is performed to discriminate whether the AE lock switch SE$_{AEL}$ has been turned on (#35). This operation is done to ascertain whether the calculation in step #34 above is performed because the AE lock has been established or because the in-focus condition has been detected. More specifically, where the in-focus condition has been detected (AELF=0), a new luminance value BV$_0$ is calculated, based on the luminance value BV$_x$ at the center and also on the luminance value BV$_0$ calculated from the values of the whole field of view (step #88 in FIG. 6(b)). The luminance value BV$_x$ is obtained under the in-focus condition each time the flow enters this routine. The shutter speed is then calculated from the new luminance value BV$_0$ (step #33 in FIG. 5(b)). For example, if the framing is altered after the in-focus condition has been detected, a new luminance value is calculated from the luminance values BV$_0$ and BV$_x$ (step #88). The luminance value BV$_0$ is calculated from the values obtained from the whole field of view after the framing. The luminance value BV$_x$ is derived from the center of the field.

When the AE lock is established (AELF=1), a new luminance value BV$_0$ is calculated from the luminance values BV$_x$ and BV$_0$. The value BV$_x$ is obtained from the center of the field when the AE lock is established. The value BV$_0$ is computed from the values of the whole field of view. The shutter speed is calculated, based on the new value BV$_0$ (step #33). That is, when the AE lock switch SW$_{AEL}$ is closed, even if a change in framing is performed, the luminance value used for exposure calculation and the shutter speed do not vary. This is carried out as shown in FIG. 5(b). First, a check is performed to see if the AE lock flag (AELF) is at level 0 or 1 (#35). If it is at level 0, the flow goes to step #33. If it is at level 1, a check is performed to ascertain whether the AE lock calculation end flag (AEEF) has been set. If the flag has not been set, it is set at (#37). Then, the flow proceeds to step #33, and the shutter speed is calculated (#35-#37). If the flag has been set in #36, the flow goes to step #42 without calculating the shutter speed.

The remaining two routines are associated with flash photography. The shutter speed is determined solely by the synchronous shutter speed of 1/60 sec. In this case, luminance values measured by the light-receiving elements shown in FIG. 2 are compared with the stored luminance values $BV_x$. Then, a light-receiving element to be used for luminance control is selected. The ratio of the main object to the area whose brightness is controlled during flash photography is increased so that the main object may be photographed with better exposure. For this purpose, the brightness-controlled area is narrowed to some extent while keeping the object in that area. More specifically, the field of view is divided into a plurality of areas corresponding to arbitrary positions on the object. Then, a measurment is made to ascertain which of the areas contains the object. The ascertained area which should be subjected to luminance control is designated. Finally, the control operation is performed.

Figure 8:
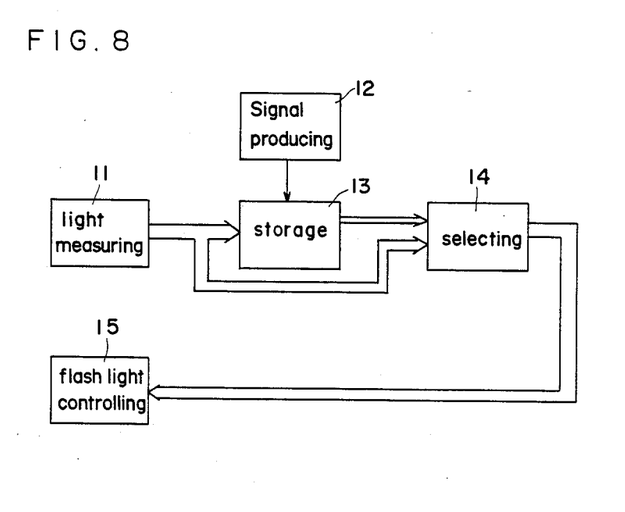
FIG. 8 is a block diagram showing the main structure for exposure calculation performed for flash photography in accordance with the first embodiment.

A construction for achieving this is shown in FIG. 8. This means comprises a light measuring means 11 for dividing the field of view to be photographed into a plurality of areas and measuring the luminance values on these areas, a flashlight control means 15 for dividing the field of view into a plurality of areas and controlling the brightness on each area with flashlight, an instruction signal-producing means 12 for producing an instruction signal that causes the output signal from the light measuring means 11 to be stored in a storage means 13, the output signal indicating the brightness at the center of the divided areas, and a selecting means 14 for determining the correlation between the stored output signal and the output signals indicating the luminance values on the areas and selecting the area to be subjected to brightness control from the areas.

When the instruction signal-producing means 12 delivers an instruction signal to the storage means 13, the storage means 13 stores the output signal indicating the brightness at the center of the divided areas among the signals produced from the light measuring means 11. The selecting means 14 receives the output signals indicative of the brightness at the center of the field of view, as well as the output signals derived from the divided areas. Then, it determines their correlation, detects the position of the main object, and instructs the brightness control means 15 which of the areas should be under brightness control of the control means 15 that is capable of controlling the brightness values on plural areas. The control means 15, of course, performs arithmetic operations for that purpose.

Routine (3) RDY=1, FLG1=0 (step 38, 39)

This is the case where the luminance value $BV_x$ obtained from the main object has not yet been accepted. That is, the position of the main object in the field of view is not yet known. Therefore, it is impossible to designate one of the areas shown in FIG. 2 as the one which contains the object. Accordingly, the whole field of view (zone 6) is subjected to brightness control. When a release operation is performed, an analog output indicating the average brightness over the whole field of view is delivered to adder circuit $ADD_1$ through analog switch ANSW along line $L_6$ (#30, #38-40 in FIG. 5(b)).

Routine (4) RDY=1, FLG1=1 (step 38, 41)

This is the condition in which the luminance value $BV_x$ derived from the main object has been accepted. The flow proceeds from step #38 to step #41, where a subroutine (ZONE detection) for detecting the area to be subjected to brightness control is carried out (see FIG. 6(c)). In this subroutine, the position of the main object within the field of view is detected. Then, the area of the light-receiving device SPC shown in FIG. 2 is determined to subject only that area to brightness control.

Figure 6C:
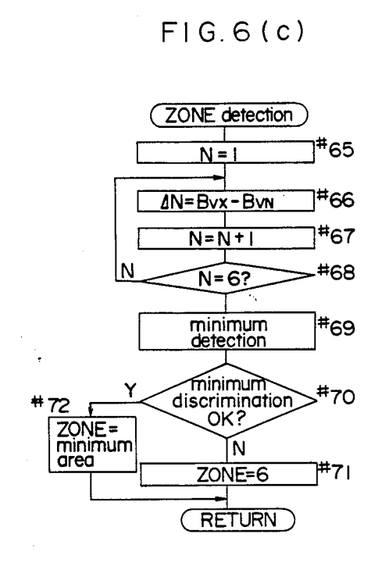

First, the luminance values $BV_1$ to $BV_5$ about the areas and the stored luminance values $BV_x$ are subjected to subtraction operations, and the area showing the minimum deviation is detected (#65-69). This area is assumed to contain the main object. When a release operation is performed, the microcomputer COM designates this area and causes the analog switch ANSW to deliver an output from that area's light-receiving device SPC to the adder ADD1 to control the brightness (#70, #72). If the minimum deviation takes too large a value, or if some values approximate to it are obtained from other areas, then the detection operation might yield an erroneous result. In this case, the whole field of view is subjected to brightness control, and when the release operation is performed, the output signal is made to indicate the average value in the same manner as in Routine (3) above (#70, #71).

Referring back to step #42 shown in FIG. 5(b), the flow goes to a routine for setting flags. When the AE lock switch $SW_{AEL}$ is turned on, AE lock flag (AEFL) is set, and flag 1 FLG1 is set (#42, #48, #49). When the AE lock switch $SW_{AEL}$ is not turned on, the AE lock flag (AELF) and AE lock calculation end flag (AEEF) are reset (#42-#44). When the automatic focus detection device detects the infocus condition and input signal APE is in state "1", at step #45 the microcomputer COM sets flag 1 (FLG1) at step #49. Under the other condition, the flag 1 (FLG1) and flag 2 (FLG2) are reset (#45-#47).

Then, the flow proceeds to a routine for holding the power supply for a certain time. This routine is carried out to maintain measurement of luminance and display for a certain period even after the switch $SW_1$, the AE lock switch $SE_{AEL}$, and the release switch $SW_2$ are turned off. The "timer" used herein means a hardware timer incorporated in the microcomputer COM. When the timer is preset and a start instruction is given to it, the timer measures time independently of the program flow. Upon completion of the measurement, the timer is interrupted (TINT) as shown in FIG. 5(a).

When the signal appearing at terminal $INT_1$ of the microcomputer COM is in state "0", the timer is started (#50, #53). When it is in state "1", the timer is stopped, and then it is preset again (#50-#52). After a given period of time is measured, the timer is interrupted (TINT) to initiate the flow from the routine TINT. Then, the timer is stopped (#13) in FIG. 5(a), followed by the execution of reset routine (RESET) as shown in FIG. 5(a). As a result, the camera is again brought to a stop condition (#12).

Then, a check is performed to ascertain whether timing switch $SW_4$ is turned on or not (#54). When the film has been completely wound by one frame up to the next position, i.e., when the timing switch $SW_4$ is open, interruption to the interruption routine INT$_2$ is allowed to permit release operation (#55).

The release operation is now described. When the film has been wound, if the release switch SW$_2$ is turned on, the interruption routine INT$_2$ is carried out. First, as shown in FIG. 5(b) an interruption to this routine is disallowed (#73). Then, the magnets Mg$_2$ and Mg$_3$ for the first and second curtains, respectively, are energized (190 74, #75). Subsequently, the analog switch ANSW is caused to designate a channel, according to the area specified by the routine for specifying the area subjected to brightness control (#76, #77). Thereafter, the focus start signal AFS and A/D conversion start signal ADSTR are brought to "0" level, and then the magnet Mg$_1$ for starting release operation is energized (#78–#80). This raises mirror MR shown in FIG. 3. It takes about 50 msec to stabilize, so that the system is on standby during this period (#81). Subsequently, integration start signal INTS varies to "1" state to de-energize the magnet Mg$_2$ for starting the movement of the first curtain (#82, #83). Then, the first curtain is tripped to switch the synchronous switch SW$_x$ to the terminal as shown in FIG. 4. At this time, if a switch for flashlight is closed, a flashlight is emitted. At the same time, an AND circuit AND goes to state "1", causing the integrator circuit INT to integrate the area specified by the subroutine for detection of the area undergoing brightness control, until a certain value is reached. Then, the comparator circuit C produces flashlight stop signal to the electronic flash device FL when the integrated value reaches a predetermined value, stopping the emission of the flashlight. After the time determined by the shutter speed elapses, the microcomputer COM de-energizes the magnet Mg$_3$ for the second curtain (#84, #85 in FIG. 5(b)). The shutter speed is set by step #40 in the flashlight photography condition and by step #33 in natural light photography condition. The microcomputer COM waits until the timing switch SW$_4$ is closed or the lowering mirror becomes stable, whereupon the flow again goes through the loop for measuring luminance (#86, #87).

Figure 9:
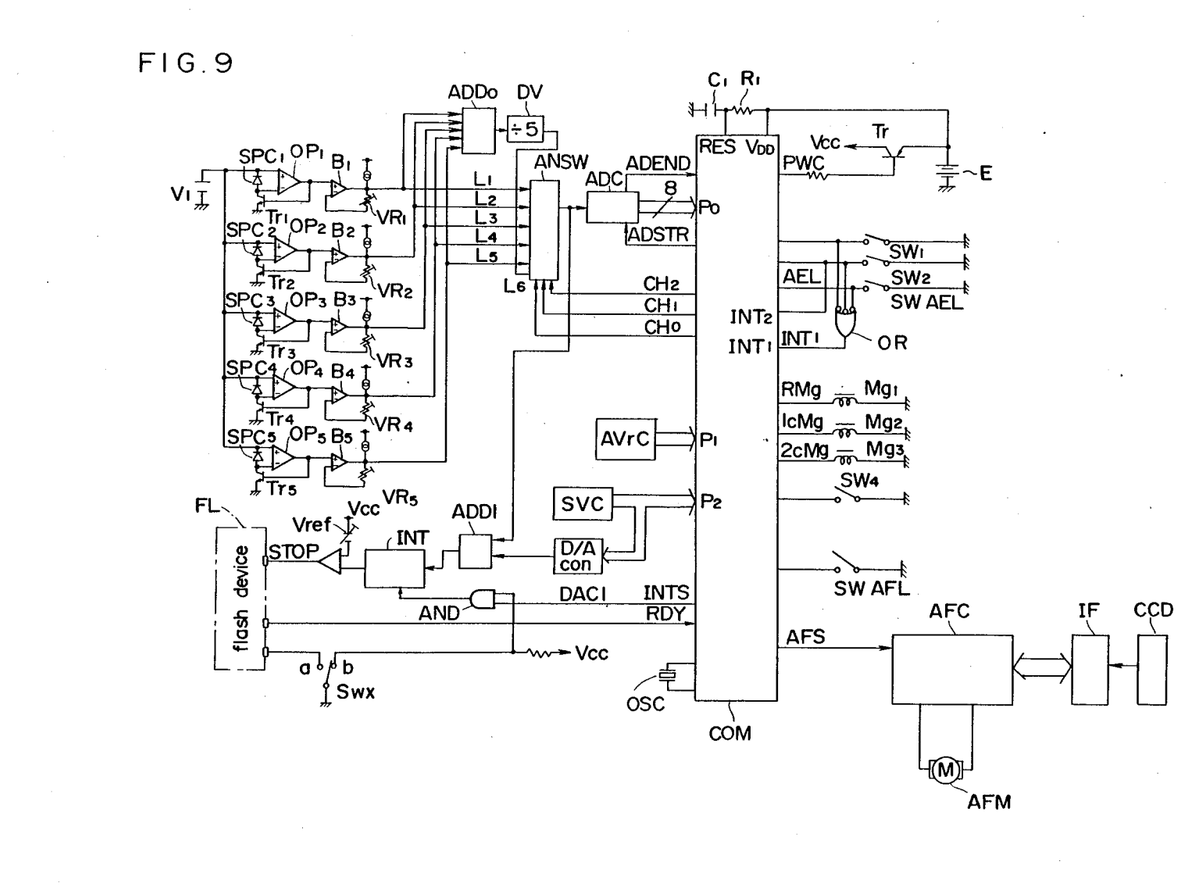
FIG. 9 is a diagram of an electric circuit constituting a second embodiment of the invention.
Figure 10:
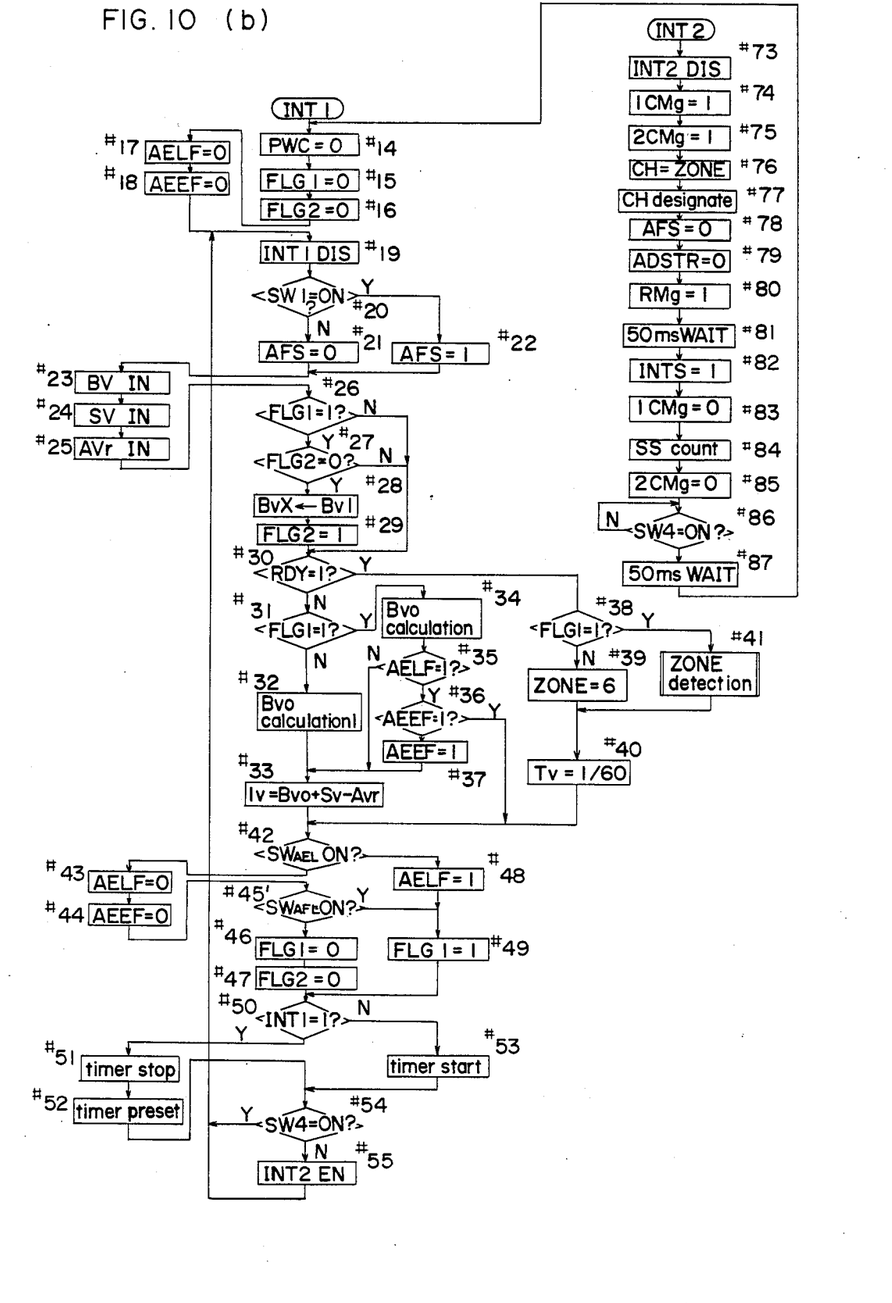
FIGS. 10(a) and 10(b) are flowcharts for illustrating a sequence of operations performed by the second embodiment.
Figure 10A:
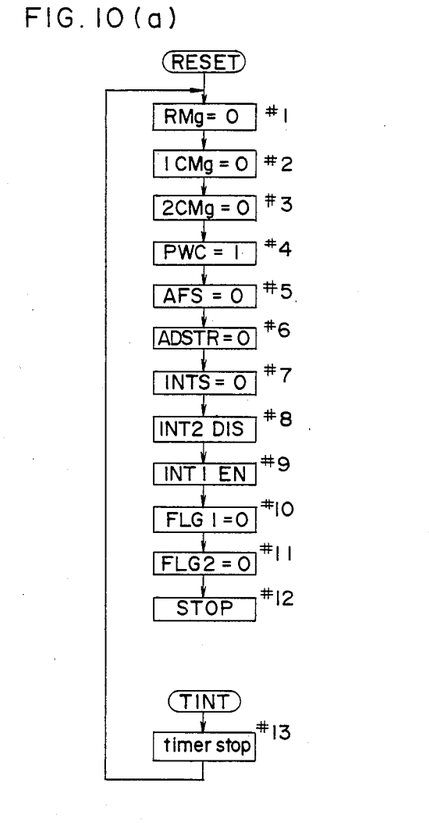
Figure 11:
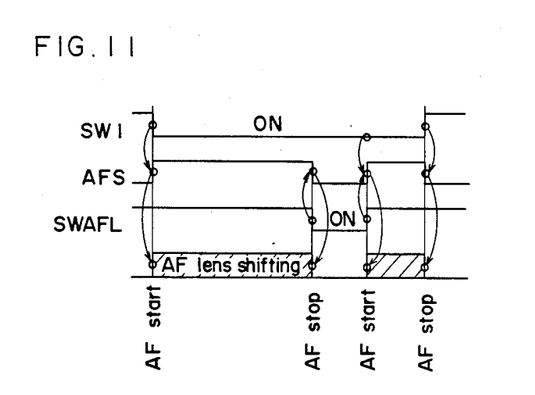
FIG. 11 is a time chart for illustrating the operation of an automatic focus detecting device used for the second embodiment.

Referring next to FIGS. 9, 10, 11, there is shown a second embodiment of the invention. The second embodiment is similar to the first embodiment except for the following structure. In the first embodiment, when the automatic focus detection device detects the once in-focus condition, the operation for the detection is halted, which is customarily called one-shot automatic focus detection. In the second embodiment, the focusing condition is continuously detected while the photography preparation switch SW$_1$ is closed. When it is desired to halt the operation for detecting the focusing condition, a newly provided AF lock switch SW$_{AFL}$ must be closed. This is known as continuous automatic focus detection. This operation is next described by referring to the time chart of FIG. 11. When the photography preparation switch SW$_1$ is closed, focus detection start signal AFS goes to state "1", initiating the detection of the focusing condition. Then, the lens L$_0$ is driven. When the AF lock switch SW$_{AFL}$ is closed, the focus detection start signal AFS goes to low level, terminating the detection. If the AF lock switch SW$_{AFL}$ is opened while the preparation switch SW$_1$ is maintained closed, the automatic focus detection device again starts to detect the focusing condition. When the preparation switch SW$_1$ is opened, the focus detection start signal AFS goes to 0 level, halting the detection.

A circuit configuration using this automatic focus-detecting device is shown in FIG. 9. The configuration shown in FIG. 9 has AF lock switch SW$_{AFL}$ for stopping the detection of the focusing condition, the switch not being used in the circuit shown in FIG. 4. Also, the line for conducting the focus detection end signal AFE from the focus-calculating circuit AFC shown in FIG. 4 is omitted in FIG. 9.

The flow of control is now described by referring to the flowcharts of FIGS. 10(a) and 10(b). In the flowchart of FIGS. 5(a) and 5(b), a flag is controlled, depending on the state of the focus detection end signal (see FIG. 5(b) at step #45. In the flowchart of FIG. 10(b), a flag is controlled, depending on the state of the AF lock switch SW$_{AFL}$ (at step #45'). They are similar in other respects. That is, when the AF lock switch SW$_{AFL}$ is closed, the luminance value BV$_x$ is accepted.

It is to be noted that the invention is not limited to the foregoing embodiments. For example, the field of view may be divided into a matrix-like arrangement, instead of the divided areas shown in FIG. 2. In this case, if the focus detecting area covers several areas, then these areas may be taken together as the center of the field of view. Also in the above embodiments, the light-receiving device for receiving natural light also act as devices for controlling brightness in flashlight photography. They may be provided separately, in which case if the light-receiving devices for controlling brightness are divided into the same number of groups, then the cost will be increased. Accordingly, it will suffice to divide the field of view into a central portion and a substantially whole portion. In this case, only when the main object is found to exist in the central portion, the brightness in the center is controlled; otherwise the brightness in the whole portion is controlled.

As described above, in accordance with the invention, the field of view is divided into a plurality of areas, and brightness values in these areas are measured. Luminance values are calculated based on the output signals derived by the measurements. When AE lock is established, or when the focus detection device detects the in-focus condition, the luminance in the center of the field of view is found. This luminance indicating the main object is used to recalculate the luminance values, for exposure calculation. Consequently, the exposure can be controlled with greater emphasis on the main object than the prior art division measurement system.

Further, the invention provides the brightness control means for dividing the field of view into several areas and controlling the brightness. In addition, the area containing the main object, among the divided areas, is subjected to brightness control. Hence, the novel device of the present invention can control the brightness with greater accuracy than the case where the conventional brightness control device is used, irrespective of either the position occupied by the subject within the field of view or its condition.

Although the present invention has been fully described with reference to the preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. An exposure calculating device, comprising:
means for measuring brightness of a measuring area with dividing the measuring area into a plurality of light measuring regions and producing a plurality of light measuring signals corresponding to each brightness of each of the light measuring regions;

means for illuminating the measuring area;

means for producing an instruction signal;

means for storing a light measuring signal indicating the brightness of a measuring region positioned in the center of the measuring area in response to the instruction signal;

means for selecting, based on the stored light measuring signal and plurality of light measuring signals, a light controlled region in which the amount of flash light should be controlled, from a plurality of light controlled regions that are determined by dividing the measuring area; and means for controlling the amount of flash light to illuminate the selected light controlled region, wherein the selecting means includes means for calculating each difference between the stored light measuring signal and each of the plurality of light measuring signals, means for detecting a light measuring region in which the calculated difference is minimum, and means for selecting a light controlled region in accordance with the detected light measuring region.

2. An exposure calculating device as claimed in claim 1, further comprising means for measuring the whole measuring area when at least one of the calculated differences is over a predetermined value.

3. An exposure calculating device as claimed in claim 1, further comprising means for measuring the whole measuring area when the plurality of light measuring regions are detected as providing the minimum difference.

4. An exposure calculating device, comprising:

means for measuring brightness of a plurality of divided areas of an objective field through an objective lens to produce a plurality of brightness signals in correspondence to said areas;

means for detecting a focusing condition of said objective lens for a predetermined area among said divided areas by receiving light passed through the objective lens, and for driving said objective lens in accordance with a detected result of the detecting means to shift the objective lens to its in-focus position;

means for storing the brightness signal corresponding to the predetermined area when the objective lens has been shifted to its in-focus position; and first means for calculating exposure information in accordance with the brightness signal stored by the storing means and the plurality of brightness signals produced by the brightness measuring means.

5. An exposure calculating device as claimed in claim 4, further comprising second means for calculating exposure information in accordance with the plurality of brightness signals produced by the brightness measuring means independently of the brightness signal stored by the storing means, and means for controlling the first and second calculating means so that the second calculating means is operated before the objective lens has been shifted to its in-focus position and the first calculating means is operated after the objective lens has been shifted to its in-focus position.

6. An exposure calculating device as claimed in claim 4, further comprising means for producing a lock signal in response to a manual operation to operate the storing means, means for permitting the storing operation of the storing means even if the lock signal is produced, and means for interrupting the storing operation of the storing means even if the objective lens has been shifted to its in-focus position in the case where the storing means has been operated in response to the lock signal.

7. An exposure calculating device, comprising:

means for measuring brightness of a plurality of divided areas of an objective field to produce a plurality of brightness signals in correspondence to said areas;

means for detecting a focusing condition of an objective lens;

means for driving said objective lens in accordance with a detected result of the detecting means to shift the objective lens to its in-focus position;

first means for calculating, on the basis of a predetermined first calculation, exposure information in accordance with the plurality of brightness signals produced by the brightness measuring means;

second means for calculating, on the basis of a predetermined second calculation different from the first calculation, exposure information in accordance with the plurality of brightness signals produced by the brightness measuring means; and means for controlling said first and second calculating means so that the first calculating means is operated before the objective lens has been shifted to its in-focus position and the second calculating means is operated after the objective lens has been shifted to its in-focus position.

* * * * *